United States Patent
Carceroni et al.

(10) Patent No.: US 9,626,384 B2
(45) Date of Patent: Apr. 18, 2017

(54) TECHNIQUES FOR USER CUSTOMIZATION IN A PHOTO MANAGEMENT SYSTEM

(71) Applicant: Google Inc., Mountain View, CA (US)

(72) Inventors: Rodrigo Carceroni, Mountain View, CA (US); Pannag Raghunath Sanketi, Fremont, CA (US); Amarnag Subramanya, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 269 days.

(21) Appl. No.: 14/547,078

(22) Filed: Nov. 18, 2014

(65) Prior Publication Data

US 2015/0074574 A1 Mar. 12, 2015

Related U.S. Application Data

(63) Continuation of application No. 13/628,820, filed on Sep. 27, 2012, now Pat. No. 8,913,152.

(51) Int. Cl.
*G06F 17/30* (2006.01)
*G06F 3/0484* (2013.01)
*H04N 5/232* (2006.01)
*G06T 11/60* (2006.01)
*G06K 9/62* (2006.01)

(52) U.S. Cl.
CPC ...... *G06F 17/3028* (2013.01); *G06F 3/04842* (2013.01); *G06K 9/6219* (2013.01); *G06T 11/60* (2013.01); *H04N 5/23216* (2013.01); *H04N 5/23293* (2013.01)

(58) Field of Classification Search
CPC ............ G06F 17/3028; G06F 3/04842; G06K 9/6219; G06T 11/60; H04N 5/23293; H04N 5/23216
USPC .......... 348/208.12, 208.14; 705/14.68, 14.69
See application file for complete search history.

(56) References Cited

U.S. PATENT DOCUMENTS

| | | | |
|---|---|---|---|
| 6,067,369 A | 5/2000 | Kamei | |
| 6,389,181 B2 | 5/2002 | Shaffer et al. | |
| 6,650,779 B2 | 11/2003 | Vachtesvanos et al. | |
| 7,274,826 B2 | 9/2007 | Kamata et al. | |

(Continued)

OTHER PUBLICATIONS

Office Action, dated Jun. 30, 2014 in related U.S. Appl. No. 13/628,735, filed Jun. 30, 2014.

(Continued)

*Primary Examiner* — Yogesh Aggarwal
(74) *Attorney, Agent, or Firm* — IP Spring

(57) ABSTRACT

A computer-implemented technique can receive a plurality of photos and automatically select a subset of the plurality of photos having a high degree of representativeness by jointly maximizing both photo quality and photo diversity to obtain a photo album. The technique can determine one or more clusters for the photo album using a hierarchical clustering algorithm, and store the photo album according to the one or more clusters. The technique can control the manner in which the photo album is displayed using the one or more clusters. The technique can adjust at least one of the one or more clusters and the automatic photo album generation based on user input. The user input can include at least one of adding, deleting, and moving a photo with respect to the one or more clusters. The technique can then re-cluster, automatically generate a new photo album, and/or adjust the presentation.

19 Claims, 5 Drawing Sheets

(56) References Cited

U.S. PATENT DOCUMENTS

| | | |
|---|---|---|
| 7,924,326 B2 | 4/2011 | Kojima |
| 8,194,922 B2 | 6/2012 | Jamison et al. |
| 8,238,615 B2 | 8/2012 | Cerosaletti et al. |
| 8,356,035 B1 | 1/2013 | Baluja et al. |
| 8,370,282 B1 | 2/2013 | Leung et al. |
| 8,478,053 B2 | 7/2013 | Ishiga |
| 8,738,553 B1 | 5/2014 | Leung |
| 2001/0046330 A1 | 11/2001 | Shaffer et al. |
| 2005/0084154 A1 | 4/2005 | Li et al. |
| 2005/0105821 A1 | 5/2005 | Hibi et al. |
| 2005/0147170 A1 | 7/2005 | Zhang et al. |
| 2006/0074771 A1 | 4/2006 | Kim et al. |
| 2006/0153460 A1 | 7/2006 | Kim et al. |
| 2006/0203261 A1 | 9/2006 | Kacker |
| 2010/0067863 A1 | 3/2010 | Wang et al. |
| 2011/0123124 A1 | 5/2011 | Peters |
| 2011/0129159 A1* | 6/2011 | Cifarelli ............. G06F 17/3028 382/224 |

OTHER PUBLICATIONS

Notice of Allowance mailed Nov. 7, 2014 in related U.S. Appl. No. 13/628,735, filed Sep. 27, 2012.

* cited by examiner

TECHNIQUES FOR USER CUSTOMIZATION IN A PHOTO MANAGEMENT SYSTEM

CROSS-REFERENCE TO RELATED APPLICATIONS

This application is a continuation of U.S. application Ser. No. 13/628,820, filed Sep. 27, 2012, which is related to co-pending U.S. application Ser. No. 13/628,735, filed on Sep. 27, 2012, entitled "TECHNIQUES FOR AUTOMATIC PHOTO ALBUM GENERATION". The disclosure of the above application are incorporated herein by reference in their entirety.

FIELD

The present disclosure relates to digital photo storage and, more particularly, to techniques for user customization in a photo management system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A computing device, e.g., a mobile phone, can include a camera that enables a user to capture photos. The photos can be stored in a memory of the computing device. The user can accumulate a large collection of photos over a period of time. The user can periodically upload the collection of photos to a server via a network. For example, the server can be associated with a social network. The user may also periodically divide his/her collection of photos into one or more photo albums. For example, the user may divide the collection of photos into one or more photo albums corresponding to one or more distinct events, respectively. The user may also delete one or more photos from the collection of photos or from a specific photo album.

SUMMARY

A computer-implemented technique is presented. The technique can include receiving, at a computing device including one or more processors, a plurality of photos. The technique can include selecting, at the computing device, a subset of the plurality of photos by performing joint global maximization of photo quality and photo diversity using a quality metric for each of the plurality of photos and a similarity matrix for the plurality of photos, the quality metric for a specific photo being indicative of a quality of the specific photo, the similarity matrix being indicative of a similarity between each unique pair of photos of the plurality of photos, wherein the quality metric and the similarity matrix are each determined based an analysis of a reference photo collection that includes a plurality of reference photos, a quality weight for each reference photo, and a similarity weight for each unique pair of reference photos. The technique can include determining, at the computing device, a plurality of clusters for the subset of the plurality of photos using a hierarchical clustering algorithm, the plurality of clusters including less than all of the subset of the plurality of photos, each of the plurality of clusters including one or more distinct photos from the subset of the plurality of photos. The technique can include storing, at the computing device, the subset of the plurality of photos arranged based on the plurality of clusters. The technique can include receiving, at the computing device, user input with respect to the subset of the plurality of photos arranged based on the one or more clusters, the user input corresponding to at least one of adding a first specific photo from a remainder of the plurality of photos to a specific cluster, deleting a second specific photo from the specific cluster, and moving the second specific photo from the specific cluster to another one of the plurality of clusters. The technique can include adjusting, at the computing device, at least one of: (i) the quality metrics and (ii) the similarity matrix when the user input corresponds to at least one of adding the first specific photo from the remainder of the plurality of photos to the specific cluster and deleting the second specific photo from the specific cluster to obtain at least one of modified quality metrics and a modified similarity matrix, (iii) the subset of the plurality of photos when the user input corresponds to at least one of adding the first specific photo from the remainder of the plurality of photos to the specific cluster and deleting the second specific photo from the specific cluster to obtain a first modified subset of the plurality of photos, and (iv) the plurality of clusters when the user input corresponds to moving the second specific photo from the specific cluster to another one of the plurality of clusters to obtain a first plurality of modified clusters. The technique can also include when at least one of the quality metrics and the similarity matrix is adjusted, selecting, at the computing device, a second modified subset of the plurality of photos by performing joint global maximization of photo quality and photo diversity using at least one of the modified quality metrics and the modified similarity matrix, determining, at the computing device, a second plurality of modified clusters for the second modified subset of the plurality of photos using the hierarchical clustering algorithm, each of the second plurality of modified clusters including one or more distinct photos from the second modified subset of the plurality of photos, and storing, at the computing device, the second modified subset of the plurality of photos arranged based on the second plurality of modified clusters.

Another computer-implemented technique is also presented. The technique can include receiving, at a computing device including one or more processors, a plurality of photos. The technique can include selecting, at the computing device, a subset of the plurality of photos by performing joint global maximization of photo quality and photo diversity using a quality metric for each of the plurality of photos and a similarity matrix for the plurality of photos, the quality metric for a specific photo being indicative of a quality of the specific photo, the similarity matrix being indicative of a similarity between each unique pair of photos of the plurality of photos. The technique can include determining, at the computing device, one or more clusters for the subset of the plurality of photos using a hierarchical clustering algorithm, the one or more clusters collectively including less than or equal to all of the subset of the plurality of photos, each of the one or more clusters including one or more distinct photos from the subset of the plurality of photos. The technique can include storing, at the computing device, the subset of the plurality of photos arranged based on the one or more clusters. The technique can include receiving, at the computing device, user input with respect to the subset of the plurality of photos arranged based on the one or more clusters, the user input corresponding to at least one of adding a first specific photo from a remainder of the plurality of photos to a specific cluster and deleting a second specific photo from the specific cluster. The technique can also include when the user input corresponds to at least one of adding the first specific photo from the remainder of the plurality of photos to the specific cluster and deleting the second specific photo from the specific cluster, adjusting, at the computing device, at least one of: (i) the quality metrics and (ii) the similarity matrix to obtain at least one of modified quality metrics and a modified similarity matrix, and (iii) the subset of the plurality of photos to obtain a first modified subset of the plurality of photos.

In some embodiments, the technique further includes when at least one of the quality metric and the similarity matrix is adjusted: selecting, at the computing device, a second modified subset of the plurality of photos by performing joint global maximization of photo quality and photo diversity using at least one of the modified quality metrics and the modified similarity matrix, determining, at the computing device, a second plurality of modified clusters for the second modified subset of the plurality of photos using the hierarchical clustering algorithm, each of the second plurality of modified clusters including one or more distinct photos from the second modified subset of the plurality of photos, and storing, at the computing device, the second modified subset of the plurality of photos arranged based on the second plurality of modified clusters.

In other embodiments, the technique further includes when the subset of the plurality of photos is adjusted: determining, at the computing device, a third plurality of modified clusters for the first modified subset of the plurality of photos using the hierarchical clustering algorithm, each of the third plurality of modified clusters including one or more distinct photos from the first modified subset of the plurality of photos, and storing, at the computing device, the first modified subset of the plurality of photos arranged based on the third plurality of modified clusters.

In some embodiments, the one or more clusters include a plurality of clusters, the user input further corresponds to moving the second specific photo from the specific cluster to another one of the plurality of clusters, and the technique further includes: adjusting, at the computing device, the plurality of clusters when the user input corresponds to moving the second specific photo from the specific cluster to another one of the plurality of clusters to obtain a first plurality of modified clusters, each of the first plurality of modified clusters including one or more distinct photos from the subset of the plurality of photos, and storing, at the computing device, the subset of the plurality of photos arranged based on the first plurality of modified clusters.

In other embodiments, the user input further corresponds to at least one of locking the specific cluster to prevent modification of the specific cluster, creating a new cluster, ignoring or deleting the specific cluster, and merging two or more clusters when the one or more clusters include a plurality of clusters.

In some embodiments, selecting the subset of the plurality of photos further includes: extracting, at the computing device, a set of quality features for each of the plurality of photos, wherein the set of quality features for a specific photo includes at least one of photometric features, saliency-based features, and content-based features for the specific photo, wherein the photometric features for the specific photo include at least one of contrast, hue diversity, sharpness, and brightness of the specific photo, wherein the saliency-based features for the specific photo include at least one of simplicity, composition quality, and lighting quality of the specific photo, and wherein the content-based features for the specific photo include a presence of at least one of a specific person, a specific place, and a specific thing, and extracting, at the computing device, a set of similarity features for each unique pair of photos of the plurality of photos, wherein the set of similarity features for a specific photo includes at least one of spatial resolution, color resolution, and temporal resolution of the specific photo.

In other embodiments, selecting the subset of the plurality of photos includes performing the joint global maximization of photo quality and photo diversity using the quality metrics and the similarity matrix includes using a determinantal point process (DPP), wherein the DPP includes calculating:

$$S_{ij} = q_i f(\phi_i, \phi_j) q_j,$$

where $S_{i,j}$ is a combined matrix of quality and similarity features, $q_i$ is a quality metric for an $i^{th}$ element, $q_j$ is a quality metric for a $j^{th}$ element, $\phi_i$ is a feature vector corresponding to the $i^{th}$ element, $\phi_j$ is a feature vector corresponding to the $j^{th}$ element, and $f(\phi_i, \phi_j)$ is a function for calculating a similarity between feature vector $\phi_i$ and feature vector $\phi_j$ using the similarity matrix.

In some embodiments, the DPP further includes performing:
(i) initializing Y={ }, J={ };
(ii) adding eigenvector $v_k$ to J with probability $\lambda_k/(\lambda_k+1)$;
(iii) while |J|>0, performing:
(a) selecting $y_i$ from Y with $$P(y_i) = \frac{1}{|J|} \sum_{v \in J} (v^T e_i)^2,$$

(b) updating $Y = Y \cup y_i$, and
(c) computing $J_\perp$, orthogonal to $e_i$ and setting $J = J_\perp$; and
(iv) returning Y,
where Y is a selected subset of photos, $v_k$ is an eigenvector associated with an index k, $\lambda_k$ is a probability associated with the index k, $y_i$ is an $i^{th}$ column of the combined matrix $S_{i,j}$ that is added to the selected subset of photos Y based on its probability $P(y_i)$, $J_\perp$ is a matrix orthogonal to a canonical basis vector $e_i$, and J is an auxiliary matrix used to compensate for elements added to the selected subset of photos Y.

In other embodiments, the DPP further includes determining a probability for the selected subset of photos Y by calculating:

$$P(Y) = \frac{\det(S_Y)}{\det(S + I)},$$

where P(Y) is a probability that the selected subset of photos Y is a representative subset of the plurality of photos, and I is an identity matrix.

In some embodiments, the DPP further includes applying a maximum-a-posteriori (MAP) approximation algorithm to determine a number of iterations for performing the selection of the selected subset of photos Y, and wherein the subset of the plurality of photos includes the selected subset of photos Y after the number of iterations, wherein the MAP approximation algorithm is defined as:
(i) receiving an input X, parameters θ, and a budget B,
(ii) U←S(X) and Y←{ }, (iii) while $U \neq \{ \}$, performing:

(a) $Y \leftarrow Y \cup \arg\max_{i \in U} \left( \frac{P_\theta(Y \cup \{i\} \mid X) - P_\theta(Y \mid X)}{\text{cost}(i)} \right)$, and (b) $U \leftarrow U \setminus \{i \mid \text{cost}(Y) + \text{cost}(i) > B\}$; and (iv) returning Y, where X represents a portion of the combined matrix $S_{i,j}$ including parameters θ, which represent at least one of quality weights and similarity weights learned from a reference photo collection, B represents a maximum amount of time or computational resources, U represents an auxiliary matrix, cost represents a required time or computational resources, and Y indicates the number of iterations.

A computing device is also presented. The computing device can include an input/output device, one or more processors, and a memory. The input/output device can be configured to receive a plurality of photos. The one or more processors can be configured to: select a subset of the plurality of photos by performing joint global maximization of photo quality and photo diversity using a quality metric for each of the plurality of photos and a similarity matrix for the plurality of photos, the quality metric for a specific photo being indicative of a quality of the specific photo, the similarity matrix being indicative of a similarity between each unique pair of photos of the plurality of photos, and determine one or more clusters for the subset of the plurality of photos using a hierarchical clustering algorithm, the one or more clusters collectively including less than or equal to all of the subset of the plurality of photos, each of the one or more clusters including one or more distinct photos from the subset of the plurality of photos. The memory can be configured to store the subset of the plurality of photos arranged based on the one or more clusters. The input/output device can be further configured to receive user input with respect to the subset of the plurality of photos arranged based on the one or more clusters, the user input corresponding to at least one of adding a first specific photo from a remainder of the plurality of photos to a specific cluster and deleting a second specific photo from the specific cluster. When the user input corresponds to at least one of adding the first specific photo from the remainder of the plurality of photos to the specific cluster and deleting the second specific photo from the specific cluster, the one or more processors can be further configured to adjust at least one of: (i) the quality metrics and (ii) the similarity matrix to obtain at least one of modified quality metrics and a modified similarity matrix, and (iii) the subset of the plurality of photos to obtain a first modified subset of the plurality of photos.

In some embodiments, when at least one of the quality metric and the similarity matrix is adjusted, the one or more processors are further configured to: select a second modified subset of the plurality of photos by performing joint global maximization of photo quality and photo diversity using at least one of the modified quality metrics and the modified similarity matrix, and determine a second plurality of modified clusters for the second modified subset of the plurality of photos using the hierarchical clustering algorithm, each of the second plurality of modified clusters including one or more distinct photos from the second modified subset of the plurality of photos, and the memory is further configured to store the second modified subset of the plurality of photos arranged based on the second plurality of modified clusters.

In other embodiments, when the subset of the plurality of photos is adjusted, the one or more processors are further configured to determine a third plurality of modified clusters for the first modified subset of the plurality of photos using the hierarchical clustering algorithm, each of the third plurality of modified clusters including one or more distinct photos from the first modified subset of the plurality of photos, and the memory is further configured to store the first modified subset of the plurality of photos arranged based on the third plurality of modified clusters.

In some embodiments, the one or more clusters include a plurality of clusters, the user input further corresponds to moving the second specific photo from the specific cluster to another one of the plurality of clusters, and the one or more processors are further configured to adjust the plurality of clusters when the user input corresponds to moving the second specific photo from the specific cluster to another one of the plurality of clusters to obtain a first plurality of modified clusters, each of the first plurality of modified clusters including one or more distinct photos from the subset of the plurality of photos, and the memory is further configured to store the subset of the plurality of photos arranged based on the first plurality of modified clusters.

In other embodiments, the one or more processors are configured to select the subset of the plurality of photos by: extracting a set of quality features for each of the plurality of photos, wherein the set of quality features for a specific photo includes at least one of photometric features, saliency-based features, and content-based features for the specific photo, wherein the photometric features for the specific photo include at least one of contrast, hue diversity, sharpness, and brightness of the specific photo, wherein the saliency-based features for the specific photo include at least one of simplicity, composition quality, and lighting quality of the specific photo, and wherein the content-based features for the specific photo include a presence of at least one of a specific person, a specific place, and a specific thing, and extracting a set of similarity features for each unique pair of photos of the plurality of photos, wherein the set of similarity features for a specific photo includes at least one of spatial resolution, color resolution, and temporal resolution of the specific photo.

In some embodiments, the one or more processors are configured to select the subset of the plurality of photos by performing the joint global maximization of photo quality and photo diversity using the quality metrics and the similarity matrix includes using a determinantal point process (DPP), wherein the DPP includes calculating:

$S_{ij} = q_i f(\phi_i, \phi_j) q_j$, where $S_{i,j}$ is a combined matrix of quality and similarity features, $q_i$ is a quality metric for an $i^{th}$ element, $q_j$ is a quality metric for a $j^{th}$ element, $\phi_i$ is a feature vector corresponding to the $i^{th}$ element, $\phi_j$ is a feature vector corresponding to the $j^{th}$ element, and $f(\phi_i, \phi_j)$ is a function for calculating a similarity between feature vector $\phi_i$ and feature vector $\phi_j$ using the similarity matrix.

In other embodiments, the DPP further includes performing:

(i) initializing $Y = \{ \}$, $J = \{ \}$;
(ii) adding eigenvector $v_k$ to J with probability $\lambda_k / (\lambda_k + 1)$;
(iii) while $|J| > 0$, performing:
  (a) selecting $y_i$ from Y with $P(y_i) = \frac{1}{|J|} \sum_{v \in J} (v^T e_i)^2$, (b) updating Y=Y∪y$_i$, and (c) computing J$_⊥$, orthogonal to e$_i$ and setting J=J$_⊥$; and (iv) returning Y, where Y is a selected subset of photos, v$_k$ is an eigenvector associated with an index k, λ$_k$ is a probability associated with the index k, y$_i$ is an i$^{th}$ column of the combined matrix S$_{i,j}$ that is added to the selected subset of photos Y based on its probability P(y$_i$), J$_⊥$ is a matrix orthogonal to a canonical basis vector and J is an auxiliary matrix used to compensate for elements added to the selected subset of photos Y.

In some embodiments, the DPP further includes determining a probability for the selected subset of photos Y by calculating:

$$P(Y) = \frac{\det(S_Y)}{\det(S+I)},$$

where P(Y) is a probability that the selected subset of photos Y is a representative subset of the plurality of photos, and I is an identity matrix.

In other embodiments, the DPP further includes applying a maximum-a-posteriori (MAP) approximation algorithm to determine a number of iterations for performing the selection of the selected subset of photos Y, and wherein the subset of the plurality of photos includes the selected subset of photos Y after the number of iterations, wherein the MAP approximation algorithm is defined as:

(i) receiving an input X, parameters θ, and a budget B, (ii) U←S(X) and Y←{ }, (iii) while U≠{ }, performing:

$$(a)\ Y \leftarrow Y \cup \arg\max_{i \in U}\left(\frac{P_\theta(Y \cup \{i\} \mid X) - P_\theta(Y \mid X)}{\mathrm{cost}(i)}\right),$$

and (b) U←U\{i|cost(Y)+cost(i)>B}; and (iv) returning Y, where X represents a portion of the combined matrix S$_{i,j}$ including parameters θ, which represent at least one of quality weights and similarity weights learned from a reference photo collection, B represents a maximum amount of time or computational resources, U represents an auxiliary matrix, cost represents a required time or computational resources, and Y indicates the number of iterations.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As previously described, a user may periodically divide a collection of photos into one or more photo albums. This task, however, can be both difficult and time consuming. The collection of photos can be automatically divided into one or more photo albums, which can significantly reduce the time spent by the user to manage the photos/albums. This can be referred to as "automatic photo album generation." Automatic photo album generation techniques may be performed by a photo management system, which can enable a user to manage and view his/her collection of photos.

Some automatic photo album generation techniques, however, are incapable of generating photo albums that meet the typical user's standards or expectations for photo album representativeness. Some photo management systems are incapable of user customization of the automatic photo album generation techniques and/or techniques for clustering and presenting photos. For example, a representative photo album generated by a photo management system using a photo album generation technique may still include too many photos for the user to view and/or manage efficiently.

Accordingly, techniques are presented for user customization of a photo management system. The techniques can include receiving a plurality of photos (a photo collection) and automatically selecting a subset of the plurality of photos (a photo album) having a high degree of representativeness by jointly maximizing both photo quality and photo diversity. The techniques can include determining one or more clusters for the subset of the plurality of photos using a hierarchical clustering algorithm, and storing the subset of the plurality of photos according to the one or more clusters. The techniques can include controlling a manner in which the subset of the plurality of photos is displayed via an input/output device using the one or more clusters. The techniques can also include adjusting at least one of the clustering (the one or more clusters) and the automatic photo album generation (the subset of the plurality of photos) based on user input. The user input can include at least one of adding a photo to a specific cluster, deleting a photo from the specific cluster, and moving a photo from the specific cluster to another of the one or more clusters. The techniques can then re-cluster, automatically generate a new photo album, and/or adjust the presentation via the input/output device.

Figure 1:
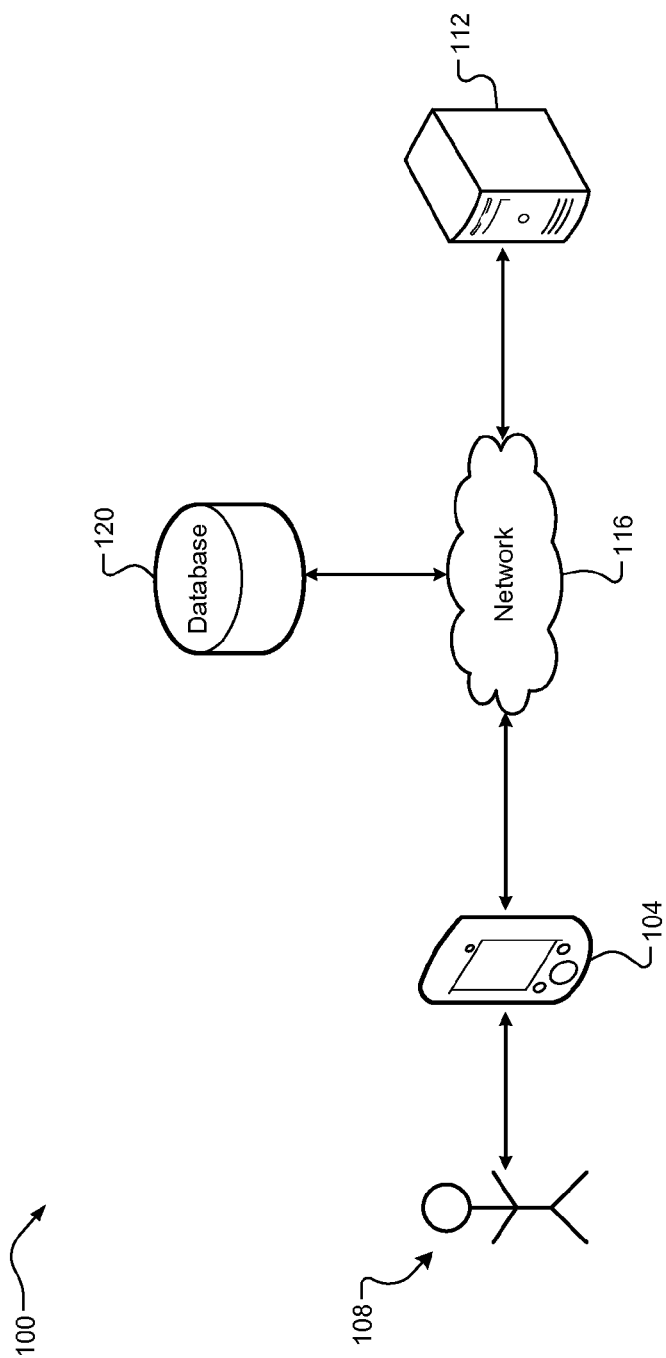
FIG. 1 is an illustration of an example computing network including a computing device according to some implementations of the present disclosure.

Referring now to FIG. 1, an example computing network 100 is illustrated. The example computing network 100 can include a computing device 104 according to some implementations of the present disclosure. As shown, the computing device 104 can be a mobile phone, however, the computing device 104 can be any suitable computing device including one or more processors, such as a desktop computer, a laptop computer, a server device, or a tablet computer. A user 108 can interact with the computing device 104. In some implementations, the computing device 104 can include a camera (not shown) that is configured to capture photos, which may be stored at the computing device 104. The computing device 104 can be configured to communicate with other devices, e.g., a server 112, via a network 116.

The server 112 can be configured to store data associated with the user 108. For example, the server 112 can be configured to receive and store a collection of photos associated with the user 108. The collection of photos can be divided into one or more photo albums. The network 116 can include a local area network (LAN), a wide area network (WAN), e.g., the Internet, or a combination thereof. The server 112 and/or the computing device 104 can communicate with a database 120 directly, or via the network 116 as illustrated. The database 120 can store a reference photo collection composed of one or more reference photos to be used as reference by the techniques of the present disclosure. The database 120, therefore, can also be referred to as reference photo collection 120. For example, the reference photo collection 120 can be a public photo database that stores one or more public photos, e.g., for a social network.

Figure 2:
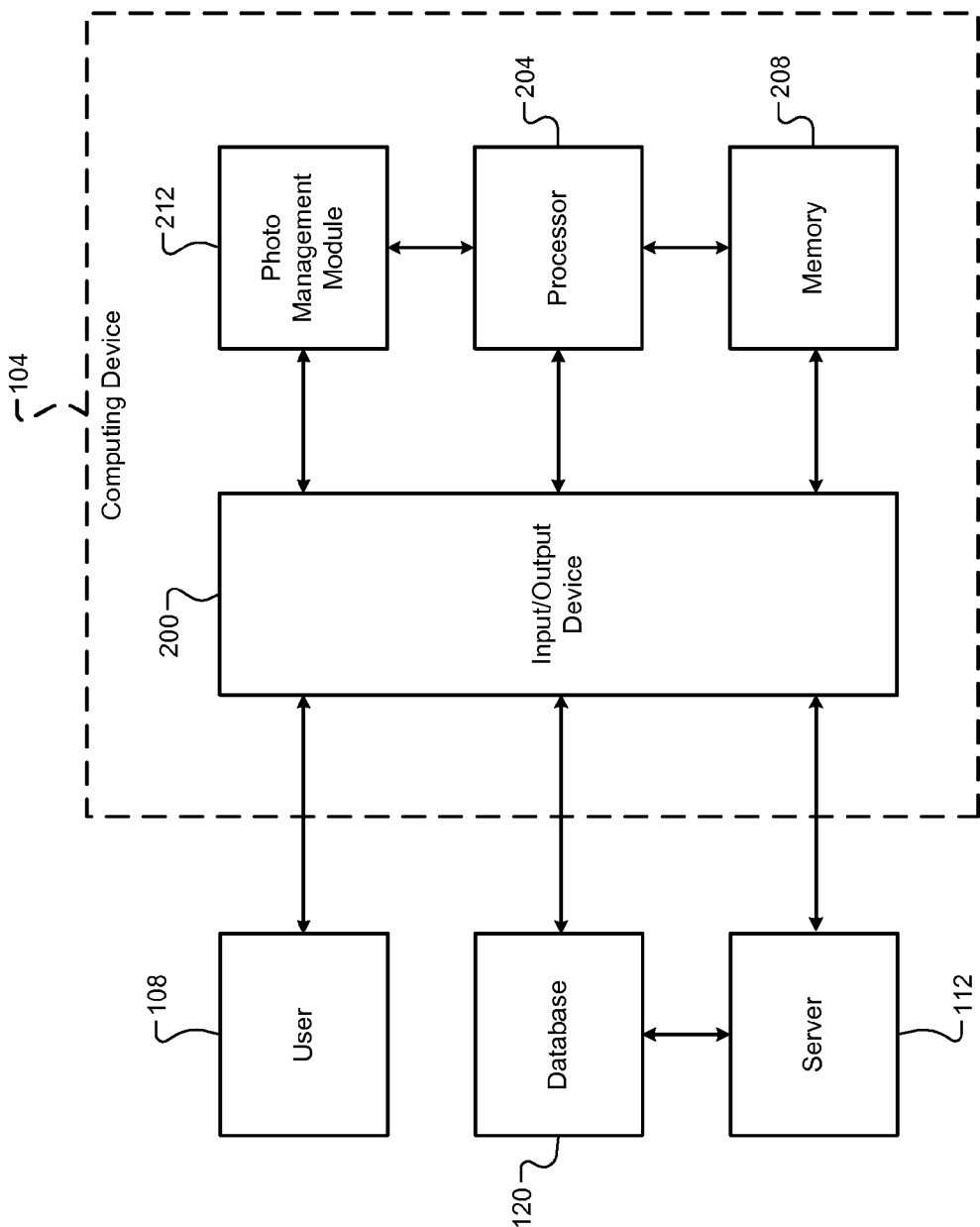
FIG. 2 is a functional block diagram of the computing device of FIG. 1 including a photo management module according to some implementations of the present disclosure.

Referring now to FIG. 2, a functional block diagram of the example computing device 104 is illustrated. The computing device 104 can include an input/output device 200, a processor 204, a memory 208, and a photo management module 212. It should be appreciated that while one processor 204 is shown, the term processor 204 used herein is meant to also include two or more processors operating in a parallel or distributed architecture. It should also be appreciated that the one or more processors can wholly or partially execute the photo management module 212.

The input/output device 200 can control input to and/or output from the computing device 104. It should be appreciated that while one input/output device 200 is shown, the term input/output device 200 used herein is meant to also include a plurality of different input/output devices. The input to the computing device 104 can include user input, e.g., from the user 108, or other input received from another device, e.g., the server 112 via the network 116. For example, the input/output device 200 can include a touch display configured to receive the user input and/or a transceiver configured to receive the other input. The output from the computing device 104 can include information for a user, e.g., for the user 108, or other information for transmission to another device, e.g., the server 112 via the network 116. As previously mentioned, the input/output device 200 can include the touch display, which can be configured to display the information for the user 108, and/or the transceiver, which can be configured to transmit the other information.

The processor 204 can control operation of the computing device 104, and can execute functions including, but not limited to, loading and executing an operating system of the computing device 104, controlling communication between the computing device 104 and other devices, e.g., the server 112 via the network 116, and/or controlling storage/retrieval operations at the memory 208. Further, as previously mentioned, the processor 204 can also wholly or partially execute the photo management module 212. For example, the photo management module 212 may be implemented as a portion of the operating system and/or as a portion of a standalone or unbundled application.

The memory 208 can be configured to store data, such as a plurality of photos, at the computing device 104. The memory 208 can be any suitable type of storage medium, such as a hard disk drive, flash memory, or dynamic random access memory (DRAM). It should be appreciated that while a single memory 208 is shown, the term memory 208 used herein is also meant to include a plurality of different types of memory. For example only, the computing device 104 can include both volatile memory, e.g., random access memory (RAM), and non-volatile memory, e.g., read-only memory (ROM).

The photo management module 212 can execute the techniques of the present disclosure. The photo management module 212 can receive a plurality of photos (a photo collection) and can automatically select a subset of the plurality of photos (a photo album) having a high degree of representativeness by jointly maximizing both photo quality and photo diversity. In some implementations, all or a portion of the photo management module 212 may be implemented at a remote server, e.g., server 112, which may have greater processing capabilities than the computing device 104. In these implementations the computing device 104 can automatically upload the plurality of photos to the remote server, which can then select the subset of the plurality of photos according to the techniques of the present disclosure, and then return the subset of the plurality of photos and/or a notification of completion to the computing device 104. For example, this process could be executed during extended periods of wall charging and limited user interaction, e.g., during the night while the user 108 is sleeping.

The photo management module 212 can determine one or more clusters for the subset of the plurality of photos using a hierarchical clustering algorithm, and can store the subset of the plurality of photos according to the one or more clusters. The photo management module 212 can control the manner in which the subset of the plurality of photos is displayed via the input/output device 200 using the one or more clusters. The photo management module 212 can also adjust at least one of the clustering (the one or more clusters) and the automatic photo album generation (the subset of the plurality of photos) based on user input. The user input can include at least one of adding a photo to a specific cluster, deleting a photo from the specific cluster, and moving a photo from the specific cluster to another of the one or more clusters. A functional block diagram of the photo management module 212 is shown in FIG. 3 and is described in detail below.

Figure 3:
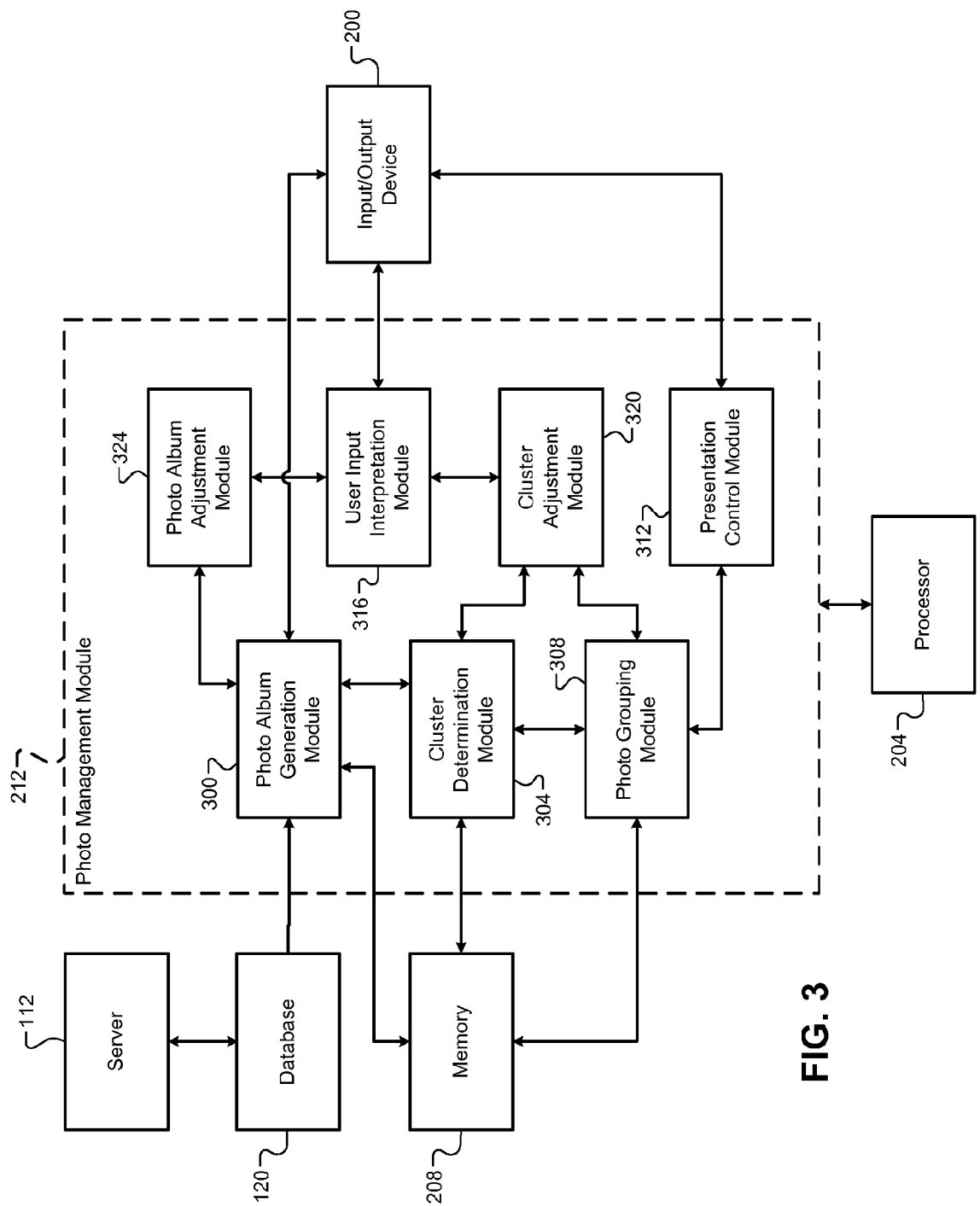
FIG. 3 is a functional block diagram of the photo management module of FIG. 2 including a photo album generation module according to some implementations of the present disclosure.

Referring now to FIG. 3, the functional block diagram of the photo management module 212 is illustrated. The photo management module 212 can include a photo album generation module 300, a cluster determination module 304, a photo grouping module 308, a presentation control module 312, a user input interpretation module 316, a cluster adjustment module 320, and a photo album adjustment module 324. As previously mentioned, the processor 204 of the computing device 104 can wholly or partially execute the photo management module 212 and its various sub-modules.

The photo album generation module 300 can receive a plurality of photos. The photo album generation module 300 can receive the plurality of photos from the memory 208 and/or via the input/output device 200. The input/output device 200 may receive the plurality of photos from a camera associated with the computing device 104 and/or from another device connected to the computing device 104. For example, the other device connected to the computing device 104 may include the server 112 or a local device connected via a peripheral cable, such as a universal serial bus (USB) cable. The photo album generation module 300 can further include memory, e.g., RAM, for at least temporarily storing the plurality of photos.

In general, the photo album generation module 300 can select the subset of the plurality of photos based on a joint global maximization of photo quality and photo diversity.

Figure 4:
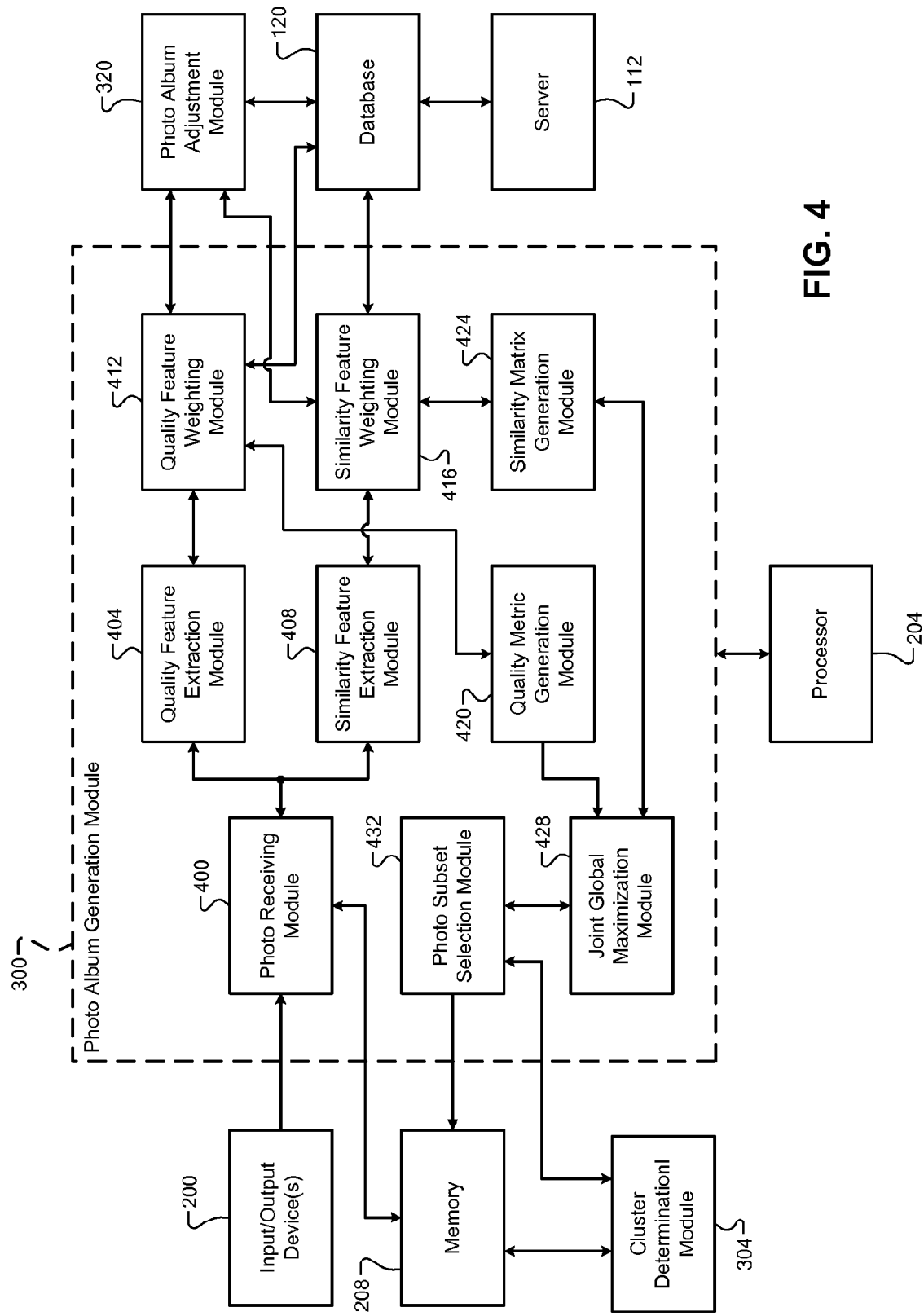
FIG. 4 is a functional block diagram of the photo album generation module of FIG. 3.

The photo album generation module 300 can extract quality and/or similarity features from each of the plurality of photos, and can determine a quality metric for each photo and a similarity matrix for the plurality of photos based on quality weights and similarity weights, respectively, which can be derived from an analysis of the reference photo collection 120. A functional block diagram of the photo album generation module 300 is shown in FIG. 4 and operation of the photo album generation module 300 is discussed in detail below in the discussion of FIG. 4.

The cluster determination module 304 can determine one or more clusters for the subset of the plurality of photos using a hierarchical clustering algorithm. In some implementations, the cluster determination module 304 may determine two or more clusters (a plurality of clusters) for the subset of the plurality of photos using the hierarchical clustering algorithm. The hierarchical clustering algorithm can be configured to cluster the subset of the plurality of photos around the content of each photo. For example, a specific cluster could include all of the selected photos from a particular event, e.g., photos from a birthday party. Clusters could also be formed around location and/or time at which the photo was taken. The number of clusters determined by the hierarchical clustering algorithm can either be predetermined, e.g., a default value, or selected by the user 108.

For example, the hierarchical clustering algorithm can be a hierarchical agglomerative clustering (HAC) algorithm. It should be appreciated that other suitable clustering algorithms may also be used. One constraint for the hierarchical clustering algorithm, however, may be that the one or more photos in each of the one or more clusters are to be distinct, that is, none of the one or more clusters overlap, or none of the photos appear in more than one cluster. Maintaining distinct clusters may make managing the photos and their cluster(s) easier, which may improve the user's experience. Further, in some implementations the cluster determination module 304 may only determine the one or more clusters for the subset of the plurality of photos when the subset of the plurality of photos includes greater than or equal to a predetermined number of photos. When the subset of the plurality of photos includes less than the predetermined number of photos, clustering of the subset of the plurality of photos may be impractical. For example only, clustering a subset of one or two photos may be impractical.

The photo grouping module 308 can divide the subset of the plurality of photos into groups based on the one or more clusters to obtain one or more groups of photos. The photo grouping module 308 can then store the one or more groups of photos in the memory 208. The photo grouping module 308 can also provide the one or more groups of photos to the presentation control module 312. Further, in some implementations the operation of the photo grouping module 308 may be adjusted by the cluster adjustment module 320 (described in detail below). For example only, the cluster adjustment module 320 may create a cluster/group, delete a cluster/group, or merge two or more clusters/groups.

The presentation control module 312 can control the manner in which the subset of the plurality of photos is displayed to the user 108 via the input/output device 200. The presentation control module 312 can receive the one or more groups of photos, which may be divided based on the one or more clusters, from the photo grouping module 308. In some implementations, the presentation control module 312 can present a single photo from each of the one or more groups as a representative photo of its group. For example, a specific photo from a specific group that has a highest score indicating quality and/or diversity may be displayed as the representative photo for the specific group. Additionally, for example only, a size of each representative photo for each group may be adjusted based on the score of the representative photo. It should also be appreciated that the presentation control module 312 can present the subset of the plurality of photos according to other configurations, e.g., display a thumbnail of each of the subset of the plurality of photos at a same time. Further, a remainder of the plurality of photos (non-selected photos) can also be presented, e.g., in another portion of a display.

The user input interpretation module 316 can receive and interpret user input with respect to the photo(s) as presented by the presentation control module 312. The user input can include selecting a representative photo to open the corresponding group of photos and/or dragging and dropping a specific cluster or a specific photo to add a photo to a group, delete a photo from a group, or merge two or more groups. For example, the user input with respect to a cluster/group can be achieved by dragging and dropping the representative photo for the cluster/group. It should be appreciated that other user input can also be received. For example, the user input may also include locking the specific cluster, creating a new cluster, deleting the specific cluster, or merging two or more clusters (when a plurality of clusters exist).

The cluster adjustment module 320 can adjust the clustering based on the user input. Adding a photo to a cluster, deleting a photo from a cluster, merging two or more clusters, creating a new cluster, and locking a cluster can all affect the output of the hierarchical clustering algorithm. For example, the subset of the plurality of photos may be adjusted when the user input corresponds to at least one of adding a first specific photo from the remainder of the plurality of photos to a specific cluster and deleting a second specific photo from the specific cluster to obtain a first modified subset of the plurality of photos. When the subset of the plurality of photos is adjusted, the cluster adjustment module 320 can command the cluster determination module 304 to determine a third plurality of modified clusters for the first modified subset of the plurality of photos using the hierarchical clustering algorithm. Each of the third plurality of modified clusters can include one or more distinct photos from the first modified subset of the plurality of photos. The photo grouping module 308 can then divide the photos into groups accordingly and store the photos in the memory 208.

Additionally or alternatively, the plurality of clusters may be adjusted when the user input corresponds to moving the second specific photo from the specific cluster to another one of the plurality of clusters to obtain a first plurality of modified clusters. When the user input corresponds to moving the second specific photo from the specific cluster to another one of the plurality of clusters, the cluster adjustment module 320 can adjust the plurality of clusters to obtain a first plurality of modified clusters. Each of the first plurality of modified clusters can include one or more distinct photos from the subset of the plurality of photos. This may be performed by or in conjunction with the cluster determination module 304. The photo grouping module 308 can then divide the photos into groups accordingly and store the photos in the memory 208.

The photo album adjustment module 324 can adjust the operation of the photo album generation module 300 in response to at least one of (i) one or more new pictures being received, (ii) user input, and (iii) changes to the reference photo collection 120. As previously described, the photo album generation module 300 can select the subset of the plurality of photos based on a joint global maximization of photo quality and photo diversity. The photo album generation module 300 can extract quality and/or similarity features from each of the plurality of photos, and can determine a quality metric for each photo and a similarity matrix for the plurality of photos based on quality weights and similarity weights, respectively, which can be derived from an analysis of the reference photo collection 120.

Therefore, for example, at least one of the quality metrics and the similarity matrix can be adjusted when the user input corresponds to at least one of adding the first specific photo from the remainder of the plurality of photos to the specific cluster and deleting the second specific photo from the specific cluster. In this case, the photo album adjustment module 324 can adjust at least one of the quality metric and the similarity matrix to obtain at least one of modified quality metrics and a modified similarity matrix. The photo album adjustment module 324 can then command the photo album generation module 320 to selecting a second modified subset of the plurality of photos by performing joint global maximization of photo quality and photo diversity using at least one of the modified quality metrics and the modified similarity matrix. The cluster determination module 304 can then determine a second plurality of modified clusters for the second modified subset of the plurality of photos using the hierarchical clustering algorithm. Each of the second plurality of modified clusters can include one or more distinct photos from the second modified subset of the plurality of photos. The photo grouping module 308 can then divide the photos into groups accordingly and store the photos in the memory 208.

In other words, the photo album adjustment module 324 can selectively adjust one or more of the quality weights and the similarity weights based on the user input. When the quality and/or similarity weights (or the corresponding quality features and/or similarity features) are learned using support vector machines (SVMs), the photo album adjustment module 324 may also perform incremental machine learning techniques for SVMs. By selectively adjusting the quality weights and/or similarity weights, the photo album adjustment module 324 can customize the automatic photo album generation performed by the photo album generation module 300 based on the user's preferences, instead of based on the typical user's preferences, which may be derived from the reference photo collection 120.

For example, the user 108 may prefer darker photos (photos having less brightness), which may be different than the preferences of the typical user, e.g., brighter photos. While user customization is described, the photo album adjustment module 324 can also incrementally train the weights for the quality features and/or similarity features for automatic photo album generation based on the reference photo collection 120, because the preferences of the user may gradually change over time. Further, the photo album adjustment module 324 can automatically generate an updated photo album when one or more new pictures are received. For explanatory purposes, a functional block diagram of the photo album generation module 300 is shown in FIG. 4 and described in detail below.

Referring now to FIG. 4, the functional block diagram of the photo album generation module 300 is illustrated. The photo album generation module 300 can include a photo receiving module 400, a quality feature extraction module 404, a similarity feature extraction module 408, a quality feature weighting module 412, a similarity feature weighting module 416, a quality metric generation module 420, a similarity matrix generation module 424, a joint global maximization module 428, and a photo subset selection module 432. As previously mentioned, the processor 204 of the computing device 104 can wholly or partially execute the photo album generation module 300 and its various sub-modules listed above and described below.

The photo receiving module 400 can receive the plurality of photos. The plurality of photos may include N photos, where N is an integer greater than one. The photo receiving module 400 can receive the plurality of photos from the memory 208 and/or via the input/output device 200. The input/output device 200 may receive the plurality of photos from a camera associated with the computing device 104 and/or from another device connected to the computing device 104. For example, the other device connected to the computing device 104 may include the server 112 or a local device connected via a peripheral cable, such as a USB cable. The photo receiving module 400 can further include memory, e.g., RAM, for at least temporarily storing the plurality of photos.

The quality feature extraction module 404 can extract one or more features from each of the plurality of photos to obtain a first set of features. Each of the first set of features can correspond to a quality of a specific photo. The first set of features, therefore, can also be referred to as a set of quality features. The first set of features for a specific photo can include at least one of photometric features, saliency-based features, and content-based features for the specific photo. The photometric features for the specific photo can include at least one of contrast, hue diversity, sharpness, and brightness of the specific photo.

The contrast feature can measure a level of contrast of the specific photo. In some implementations, the contrast feature may be a computation of a length of the red-green-blue (RGB) color histogram interval that covers a predetermined amount of the histogram's total mass. For example, the predetermined amount may be 90%, which does not include 5% intervals at each end of the histogram. The hue diversity feature may involve a computation of a histogram of hue values that have saturation and brightness within a predefined range. The hue diversity feature can use this histogram to quantify how many dominant hue values are present, which can be expressed as a score proportional to the quantity.

The saliency-based features for the specific photo can include at least one of simplicity, composition quality, and lighting quality of the specific photo. Saliency-based features can quantify whether the specific photo includes a clear, salient object. Extracting a specific saliency-based feature for the specific photo, therefore, can further include filtering the specific photo to identify a salient portion of the specific photo that encompasses greater than a predetermined amount of the salient object in the specific photo. For example, the predetermined amount may be 90%. The specific saliency-based feature for the specific photo can then be extracted from the specific photo using the salient portion.

The simplicity feature can use the salient portion to quantify how much area the object covers with respect to a total area of the specific photo. The composition quality feature can use a center portion of the salient portion to assess how much the specific photo conforms to a "rule of thirds" for photography. The rule of third suggests that the object should be oriented at a distance of one third the total area from each of the borders of the specific photo for increased aesthetic value. The lighting quality feature can measure a difference between an amount of brightness of the object and an amount of brightness in a background of the specific photo.

The content-based features for the specific photo can include a presence of at least one of a specific person, a specific place, and a specific thing. For example, a content-based feature may be a presence of the user 108 in a specific photo or a presence of a specific landmark. In general, the presence of human faces is a strong indication of photo desirability. A single face, however, may be more desirable than a photo that includes a plurality of different faces, each of which may be hard to distinguish.

The similarity feature extraction module 408 can extract one or more second features from each of the plurality of photos. Each of the second set of features can indicate a similarity between a specific photo and another one or more of the plurality of photos. The second set of features, therefore, can also be referred to as a set of similarity features. The second set of features for a specific photo can include at least one of spatial resolution, color resolution, and temporal resolution of the specific photo.

Extracting a specific feature of the second set of features for the specific photo further can include generating a hierarchical histogram for the specific photo, the hierarchical histogram including one or more visual words. Each visual word can include at least one of textons and colors. A texton can indicate human texture perception. For example, the color may be in the hue-saturation-value (HSV) color space. It should be appreciated, however, that other color spaces can be used, e.g., the hue-saturation-lightness (HSL) color space. Furthermore, it should be appreciated that other image features can be used, to either replace or augment the visual words. For example, scale-invariant feature transform (SIFT) and/or histogram of orientated gradients (HOG) features can be used. Alternatively, TinyImage features can be used. Using TinyImage features can include down-sampling the specific photo to a predetermined resolution, e.g., 32×32 pixels, concatenating the pixel values to obtain a feature vector, e.g., 32×32×3 or 3072 dimensions, and then applying K-means clustering to the feature vector with random initial cluster centers.

Temporal resolution may also be included. If visual words are used, the hierarchical histogram can be modified by adding a timestamp of the specific photo to obtain a modified hierarchical histogram. The similarity feature extraction module 408 can then extract the specific feature of the second set of features for the specific photo based on the modified hierarchical histogram. Temporal resolution can be important because pictures taken close in time tend to be more similar, whereas pictures far apart in time, e.g., in different seasons, can be very different. The timestamp can include a day and a month that the specific photo was captured. In some implementations, the timestamp can be normalized within the day, e.g., a value between 0 and 1, and within the month, e.g., another value between 0 and 1. The timestamp can also be weighted with respect to the other similarity features. For example, the timestamp may account for approximately 17% of the similarity metric.

The quality feature weighting module 412 can obtain a quality weight for each of the one or more first features. Specifically, the quality feature weighting module 412 can obtain a quality weight for each of the one or more first features based on an analysis of the reference photo collection 120 to obtain a first set of weights (a set of quality weights). As previously mentioned, the reference photo collection 120 may be a public photo database indicative of quality preferences of a typical user. The reference photo collection 120 can include a plurality of reference photos and a quality weight for each reference photo in the plurality of reference photos. The analysis of the reference photo collection 120 can include performing machine learning of the first set of weights using an L2 regularization with an L2-loss (squared loss) function. For example, the analysis of the reference photo collection 120 can be performed by the server 112, which may have greater processing capabilities than the computing device 104.

The similarity feature weighting module 416 can obtain a similarity weight for each of the one or more second features. Specifically, the similarity feature weighting module 416 can obtain the similarity weight for each of the one or more second features based on an analysis of the reference photo collection 120 to obtain a second set of weights (a set of similarity weights). As previously mentioned, the reference photo collection 120 may be a public photo database indicative of similarity preferences of a typical user. The reference photo collection 120 can include a similarity weight for each unique pair of reference photos in the plurality of reference photos. The analysis of the reference photo collection 120 can include any suitable techniques. For example, the computing device 104 or the server 112 may use the same or similar techniques as described above with respect to the quality feature weighting module 412.

The quality metric generation module 420 can generate a quality metric for each of the plurality of photos. The quality metric can also be referred to as a quality score. The quality metric generation module 420 can generate the quality metric for a specific photo by analyzing the first set of features for a specific photo to obtain a set of quality scores. The quality metric generation module 420 can then combine the set of quality scores using the first set of weights to obtain the quality metric for the specific photo. In other words, a single quality metric can be generated for a specific photo of the plurality of photos by combining the quality metrics relating to the set of quality features for the specific photo according to the set of quality weights, respectively. In some implementations, the set of quality features includes two or more features. It should be appreciated, however, that the set of quality features may include a single feature, which may not involve the step of combining in order to obtain the quality metric.

The similarity matrix generation module 424 can determine a similarity matrix $L_{i,j}$ for the plurality of photos. For example, the similarity matrix can include one or more similarity metrics for each photo of the plurality of photos, with reference to each of a remainder of the plurality of photos. The similarity matrix generation module 424 can determine the similarity matrix by analyzing the second set of features for a specific pair of photos to obtain a set of similarity metrics. The similarity matrix generation module 424 can then generate the similarity matrix using the set of similarity metrics and the second set of weights. The similarity matrix, therefore, can be an N×N matrix that indicates a similarity between each of the N photos and each of a remainder of the N photos (the other N−1 photos). In other words, the similarity metric can indicate a similarity between each unique pair of photos of the plurality of photos. The value for each element in the similarity matrix may be a value between 0 and 1. Note, however, that a similarity between a specific photo and itself (or a duplicate) in the similarity matrix may be a value of 1.

The joint global maximization module 428 can perform joint global maximization of quality and diversity for the plurality of photos. The joint global maximization module 428 can generate a combined matrix $S_{i,j}$ that represents a combination of the quality metrics and the similarity matrix. For example, the combined matrix $S_{i,j}$ can be calculated as follows:

$$S_{ij} = q_i f(\phi_i, \phi_j) q_j,$$

where $S_{i,j}$ is the combined matrix of quality and similarity features, $q_i$ is a quality metric for an $i^{th}$ element, $q_j$ is a quality metric for a $j^{th}$ element, $\phi_i$ is a feature vector corresponding to the $i^{th}$ element, $\phi_j$ is a feature vector corresponding to the $j^{th}$ element, and $f(\phi_i, \phi_j)$ is a function for calculating a similarity between feature vector $\phi_i$ and feature vector $\phi_j$ using the similarity matrix.

The photo subset selection module 432 can select a subset of the plurality of photos based on the results of the joint global maximization module 428. More specifically, the photo subset selection module 432 can select the subset of the plurality of photos using on the combined matrix $S_{i,j}$. The subset of the plurality of photos can include Y photos, where Y is an integer less than or equal to N. The photo subset selection module 432 can implement a determinantal point process (DPP). DPPs can provide tractable algorithms for exact inference (including computing marginal probabilities and sampling), which can be useful for subset selection where diversity is preferred.

The photo subset selection module 432 can perform the DPP as follows. First, the DPP can include performing the following process (hereinafter Process 1):
  (i) initializing Y={ }, J={ };
  (ii) adding eigenvector $v_k$ to J with probability $\lambda_k/(\lambda_k+1)$;
  (iii) while |J|>0, performing:
    (a) selecting $y_i$ from Y with $$P(y_i) = \frac{1}{|J|} \sum_{v \in J} (v^T e_i)^2,$$

(b) updating $Y = Y \cup y_i$, and
    (c) computing $J_\perp$, orthogonal to $e_i$ and setting $J = J_\perp$; and
  (iv) returning Y,
where Y is a selected subset of photos, $v_k$ is an eigenvector associated with an index k, $\lambda_k$ is a probability associated with the index k, $y_i$ is an $i^{th}$ column of the combined matrix $S_{i,j}$ that is added to the selected subset of photos Y based on its probability $P(y_i)$, $J_{\perp 0}$ is a matrix orthogonal to a canonical basis vector $e_i$, and J is an auxiliary matrix used to compensate for elements added to the selected subset of photos Y.

Next, the DPP can include determining a probability for the selected subset of photos Y by calculating:

$$P(Y) = \frac{\det(S_Y)}{\det(S + I)},$$

where P(Y) is a probability that the selected subset Y is a representative subset of the plurality of photos, and I is an identity matrix. In some implementations, the photo subset selection module 432 may select the subset Y if the probability P(Y) is greater than a predetermined threshold indicating an acceptable representativeness of a typical user. If the probability P(Y) is less than the predetermined threshold, however, the photo subset selection module 432 can repeat Process 1 above to determine another subset Y.

In some implementations, the DPP can include applying a maximum-a-posteriori (MAP) approximation algorithm to determine a number of iterations for performing the selection of the selected subset of photos Y (Process 1), and wherein the subset of the plurality of photos includes the selected subset of photos Y after the number of iterations. For example, the MAP approximation algorithm (hereinafter Process 2) may be defined as follows:
  (i) receiving an input X, parameters θ, and a budget B,
  (ii) U←S(X) and Y←{ },
  (iii) while U≠{ }, performing:

$$(a) \; Y \leftarrow Y \cup \arg\max_{i \in U} \left( \frac{P_\theta(Y \cup \{i\} \mid X) - P_\theta(Y \mid X)}{\text{cost}(i)} \right),$$

and
    (b) U←U\{i|cost(Y)+cost(i)>B}; and
  (iv) returning Y,
where X represents a portion of the combined matrix $S_{i,j}$ including parameters θ, which represent quality weights and/or feature weights, B represents a maximum amount of time or computational resources (e.g., a budget), U represents an auxiliary matrix, cost represents a required time or computational resources, and Y indicates the number of iterations. It should be appreciated, however, that other MAP approximation algorithms can be used instead of Process 2.

As previously mentioned, after determining the optimal number of iterations, the photo subset selection module 432 can perform Process 1 for the optimal number of iterations. The resulting subset of photos Y after the last one of the optimal number of iterations can be the subset of the plurality of photos (the photo album). The photo subset selection module 432 can then output the subset of the plurality of photos. The subset of the plurality of photos can be stored in the memory 208 and/or can be output via the input/output device 200. For example, the input/output device 200 can display the subset of the plurality of photos to the user 108. Additionally or alternatively, for example, the input/output device 200 can output the subset of the plurality of photos to another device, such as the server 112 or another local device, e.g., via a USB cable.

Figure 5:
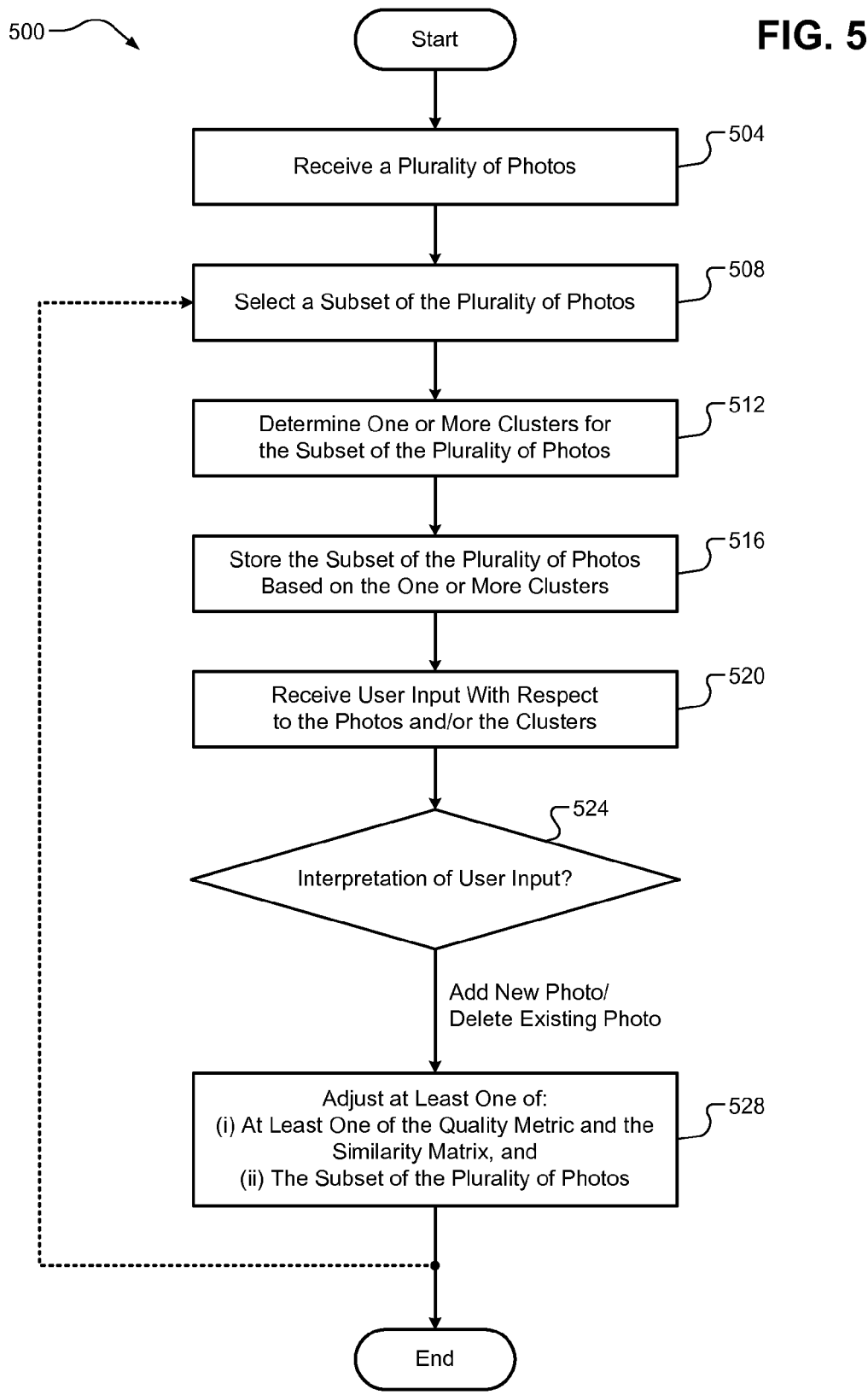
FIG. 5 is a flow diagram of an example technique for user customization of a photo management system according to some implementations of the present disclosure.

Referring now to FIG. 5, a flow diagram for an example technique 500 for user customization in a photo management system is illustrated. At 504, the computing device 104 can receive a plurality of photos. At 508, the computing device 104 can select a subset of the plurality of photos by performing joint global maximization of photo quality and photo diversity using a quality metric for each of the plurality of photos and a similarity matrix for the plurality of photos. The quality metric for a specific photo can be indicative of a quality of the specific photo and the similarity matrix can be indicative of a similarity between each unique pair of photos of the plurality of photos.

At 512, the computing device 104 can determine one or more clusters for the subset of the plurality of photos using a hierarchical clustering algorithm. The one or more clusters can collectively include less than or equal to all of the subset of the plurality of photos, and each of the one or more clusters can include one or more distinct photos from the subset of the plurality of photos. At 516, the computing device 104 can store the subset of the plurality of photos arranged based on the one or more clusters. At 520, the computing device 104 can receive user input with respect to the subset of the plurality of photos arranged based on the one or more clusters. The user input can correspond to at least one of adding a first specific photo from a remainder of the plurality of photos to a specific cluster and deleting a second specific photo from the specific cluster.

At 524, the computing device 104 can interpret the user input to determine one or more actions to perform. When the user input corresponds to at least one of adding the first specific photo from the remainder of the plurality of photos to the specific cluster and deleting the second specific photo from the specific cluster, the technique 500 can proceed to 528. At 528, the computing device 104 can adjust at least one of: at least one of (i) the quality metrics and (ii) the similarity matrix to obtain at least one of modified quality metrics and a modified similarity matrix and (iii) the subset of the plurality of photos to obtain a first modified subset of the plurality of photos. The technique 500 can then end or return to 504 for one or more additional cycles. For example only, when at least one of the quality metrics and the similarity matrix are adjusted, the technique 500 can return to 508 to select a new subset of the plurality of photos using at least one of the modified quality metrics and the modified similarity matrix.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method comprising:
    receiving, by a computing device including one or more processors, a plurality of photos;
    selecting, by the computing device, a first subset of the plurality of photos based on maximizing photo quality and photo diversity using a quality metric for each of the plurality of photos and a similarity matrix for the plurality of photos, the quality metric for a photo being indicative of a quality of such photo, the similarity matrix being indicative of similarity between each pair of photos of the plurality of photos, wherein the first subset of photos is selected using joint global maximization
    determining, by the computing device, a first set of one or more clusters for the first subset of the plurality of photos using hierarchical clustering, the first set of clusters including less than or equal to all of the first subset of the plurality of photos, each of the one or more clusters in the first set of one or more clusters including one or more distinct photos from the first subset of the plurality of photos;
    storing, by the computing device, the photos arranged by the first set of one or more clusters;
    receiving, by the computing device, user input with respect to the first subset of the plurality of photos, the user input corresponding to at least one of adding a first specific photo from a remainder of the plurality of photos to one of the one or more clusters in the first set of one or more clusters, and deleting a second specific photo from one of the one or more clusters in the first set of one or more clusters;
    adjusting, at the computing device, at least one of the quality metric and the similarity matrix based on the user input;
    selecting, by the computing device, a second subset of the plurality of photos based on maximizing photo quality and photo diversity using the adjusted at least one of the quality metric and the similarity matrix;
    determining, by the computing device, a second set of one or more clusters for the second subset of the plurality of photos using hierarchical clustering; and
    storing, at the computing device, second subset of the plurality of photos arranged in the second set of one or more clusters.

2. A computer-implemented method comprising:
    receiving, by a computing device including one or more processors, a plurality of photos;
    selecting, by the computing device, a first subset of the plurality of photos based on maximizing photo quality and photo diversity using a quality metric for each of the plurality of photos and a similarity matrix for the plurality of photos, the quality metric for a photo being indicative of a quality of such photo, the similarity matrix being indicative of similarity between each pair of photos of the plurality of photos, wherein the first subset of photos is selected using joint global maximization
    determining, by the computing device, a first set of one or more clusters for the first subset of the plurality of photos using hierarchical clustering, the first set of clusters including less than or equal to all of the first subset of the plurality of photos, each of the one or more clusters in the first set of one or more clusters including one or more distinct photos from the first subset of the plurality of photos; and
    storing, by the computing device, the photos arranged by the first set of one or more clusters.

3. The computer-implemented method of claim 2, further comprising:
    receiving, by the computing device, user input with respect to the first subset of the plurality of photos, the user input corresponding to at least one of adding a first specific photo from a remainder of the plurality of photos to one of the one or more clusters in the first set of one or more clusters, and deleting a second specific photo from one of the one or more clusters in the first set of one or more clusters.

4. The computer-implemented method of claim 3, further comprising:
    adjusting, at the computing device, at least one of the quality metric and the similarity matrix based on the user input.

5. The computer-implemented method of claim 4, further comprising:
    selecting, by the computing device, a second subset of the plurality of photos based on maximizing photo quality and photo diversity using the adjusted at least one of the quality metric and the similarity matrix.

6. The computer-implemented method of claim 5, further comprising:
    determining, by the computing device, a second set of one or more clusters for the second subset of the plurality of photos using hierarchical clustering.

7. The computer-implemented method of claim 6, further comprising:

storing, at the computing device, second subset of the plurality of photos arranged in the second set of one or more clusters.

8. The computer-implemented method of claim 2, wherein the quality metric and the similarity matrix are each determined based an analysis of a reference photo collection that includes a plurality of reference photos, a quality weight for each reference photo, and a similarity weight for each unique pair of reference photos.

9. The computer-implemented method of claim 2, wherein the user input further corresponds to moving the second specific photo from the specific cluster to another one of the plurality of clusters.

10. The computer-implemented method of claim 2, wherein selecting the first subset of photos is selected by performing the joint global maximization of photo quality and photo diversity using the quality metrics and the similarity matrix including using a determinantal point process (DPP).

11. The computer-implemented method of claim 2, wherein selecting the subset of the plurality of photos further includes:
extracting, at the computing device, a set of quality features for each of the plurality of photos, wherein the set of quality features for a specific photo includes at least one of photometric features, saliency-based features, and content-based features for the specific photo.

12. A computing device comprising:
an input/output device configured to receive a plurality of photos;
one or more processors configured to:
receive a plurality of photos;
select a first subset of the plurality of photos based on maximizing photo quality and photo diversity using a quality metric for each of the plurality of photos and a similarity matrix for the plurality of photos, the quality metric for a photo being indicative of a quality of such photo, the similarity matrix being indicative of similarity between each pair of photos of the plurality of to photos, wherein the first subset of photos is selected using joint global maximization
determine a first set of one or more clusters for the first subset of the plurality of photos using hierarchical clustering, the first set of clusters including less than or equal to all of the first subset of the plurality of photos, each of the one or more clusters in the first set of one or more clusters including one or more distinct photos from the first subset of the plurality of photos; and
store the photos arranged by the first set of one or more clusters.

13. The computing device of claim 12, further configured to:
receive user input with respect to the first subset of the plurality of photos, the user input corresponding to at least one of adding a first specific photo from a remainder of the plurality of photos to one of the one or more clusters in the first set of one or more clusters, and deleting a second specific photo from one of the one or more clusters in the first set of one or more clusters.

14. The computing device of claim 13, further configured to:
adjust at least one of the quality metric and the similarity matrix based on the user input; and
select, by the computing device, a second subset of the plurality of photos based on maximizing photo quality and photo diversity using the adjusted at least one of the quality metric and the similarity matrix.

15. The computing device of claim 14, further configured to:
determine a second set of one or more clusters for the second subset of the plurality of photos using hierarchical clustering; and
store the second subset of the plurality of photos arranged in the second set of one or more clusters.

16. The computing device of claim 12, wherein the quality metric and the similarity matrix are each determined based an analysis of a reference photo collection that includes a plurality of reference photos, a quality weight for each reference photo, and a similarity weight for each unique pair of reference photos.

17. The computing device of claim 13, wherein the user input further corresponds to moving the second specific photo from the specific cluster to another one of the plurality of clusters.

18. The computing device of claim 12, wherein the first subset of photos is selected by performing joint global maximization of photo quality and photo diversity using the quality metrics and the similarity matrix including using a determinantal point process (DPP).

19. The computing device of claim 12, wherein selecting the subset of the plurality of photos further includes extracting, at the computing device, a set of quality features for each of the plurality of photos, wherein the set of quality features for a specific photo includes at least one of photometric features, saliency-based features, and content-based features for the specific photo.

* * * * *